US009772861B2

(12) United States Patent
DeLuca

(10) Patent No.: US 9,772,861 B2
(45) Date of Patent: Sep. 26, 2017

(54) ACCESSING OPERATING SYSTEM ELEMENTS VIA A TAG CLOUD

(75) Inventor: Lisa Seacat DeLuca, San Francisco, CA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1381 days.

(21) Appl. No.: 12/816,234

(22) Filed: Jun. 15, 2010

(65) Prior Publication Data

US 2011/0307792 A1 Dec. 15, 2011

(51) Int. Cl.
G06F 17/30 (2006.01)
G06F 9/44 (2006.01)
H04L 29/08 (2006.01)

(52) U.S. Cl.
CPC ........ G06F 9/4446 (2013.01); G06F 17/3082 (2013.01); H04L 29/08675 (2013.01); H04L 67/22 (2013.01)

(58) Field of Classification Search
CPC . H04L 41/22; H04L 29/08675; H04L 25/061; H04L 2/1831; H04L 67/22; H04L 67/02; G06F 3/0484; G06F 3/0482; G06F 17/30867; H04N 21/482
USPC ........................................ 715/736, 789, 811
See application file for complete search history.

(56) References Cited

U.S. PATENT DOCUMENTS

| | | | |
|---|---|---|---|
| 5,349,658 A * | 9/1994 | O'Rourke et al. | 715/839 |
| 5,731,813 A * | 3/1998 | O'Rourke et al. | 715/810 |
| 6,005,567 A | 12/1999 | Nielsen | |
| 6,041,355 A * | 3/2000 | Toga | 709/227 |
| 6,466,238 B1 * | 10/2002 | Berry | G06F 9/4443 707/999.202 |
| 7,237,240 B1 | 6/2007 | Chen et al. | |
| 7,543,244 B2 | 6/2009 | Matthews et al. | |
| 7,565,613 B2 * | 7/2009 | Forney | 715/745 |
| 7,752,534 B2 * | 7/2010 | Blanchard et al. | 715/204 |
| 8,275,399 B2 * | 9/2012 | Karmarkar et al. | 455/466 |
| 8,375,024 B2 * | 2/2013 | Goeldi | 707/722 |
| 2005/0015728 A1 | 1/2005 | Ragan et al. | |
| 2006/0100784 A1 * | 5/2006 | Wang | 702/3 |
| 2006/0107219 A1 | 5/2006 | Ahya et al. | |
| 2006/0218112 A1 * | 9/2006 | Van De Sluis | G06F 3/033 |
| 2007/0083827 A1 | 4/2007 | Scott et al. | |
| 2007/0129977 A1 * | 6/2007 | Forney | 705/7 |
| 2008/0071929 A1 * | 3/2008 | Motte et al. | 709/246 |
| 2008/0072145 A1 * | 3/2008 | Blanchard et al. | 715/273 |
| 2009/0030774 A1 * | 1/2009 | Rothschild et al. | 705/10 |
| 2009/0199133 A1 | 8/2009 | Deutsch et al. | |
| 2009/0222551 A1 * | 9/2009 | Neely et al. | 709/224 |

(Continued)

*Primary Examiner* — Rinna Yi

(74) *Attorney, Agent, or Firm* — Steven L. Nichols; Fabian VanCott

(57) ABSTRACT

Providing access to an element in an operating system executed by a processor includes: with the processor, tracking behavior of a user with respect to multiple elements managed by the operating system; displaying a tag cloud to the user with a display device, the tag cloud having multiple objects, each of the objects representing one of the elements managed by the operating system and having a size based on the tracked behavior of the user with respect to the element managed by the operating system; and allowing, with the processor, the user to access at least one of the elements using the tag cloud.

17 Claims, 9 Drawing Sheets

(56) References Cited

U.S. PATENT DOCUMENTS

| | | | | |
|---|---|---|---|---|
| 2010/0064007 | A1* | 3/2010 | Randall | 709/204 |
| 2010/0070860 | A1* | 3/2010 | Alkov et al. | 715/716 |
| 2010/0080470 | A1* | 4/2010 | Deluca et al. | 382/209 |
| 2010/0082583 | A1* | 4/2010 | Chang et al. | 707/706 |
| 2010/0269067 | A1* | 10/2010 | De Bel Air et al. | 715/811 |
| 2011/0296345 | A1* | 12/2011 | Friedman | 715/811 |
| 2013/0007661 | A1* | 1/2013 | Klappert et al. | 715/811 |
| 2013/0172021 | A1* | 7/2013 | Karmarkar et al. | 455/457 |

* cited by examiner

ACCESSING OPERATING SYSTEM ELEMENTS VIA A TAG CLOUD

BACKGROUND

Aspects of the present invention relate to operating systems executed by processors. More particularly, the present invention relates to interfacing with a user through an operating system to launch applications and open files.

A tag cloud is a visual representation of multiple objects, such as words, in a way that a weighted value associated with each object is visually apparent. Typically the weighted value associated with each object is represented in a tag cloud by the size and/or color of the object.

For most tag clouds presently used in the art, the weighted value associated with each object represents a metric of how frequently that object appears in a specific document. For example, a tag cloud can be generated for a website to provide a quick overview of the most commonly appearing words in the website. In this type of tag cloud, each of the commonly appearing words in the website is displayed, where the size or color of the font for each displayed word represents how often that word appears within the text of the website. Thus, the most frequently used words in the website may appear in the tag cloud with a large font size, where the less-frequently used words in the website may appear with a smaller font size.

BRIEF SUMMARY

A method of providing access to an element in an operating system executed by a processor includes: with the processor, tracking behavior of a user with respect to multiple elements managed by the operating system; generating a tag cloud having multiple objects, each of the objects representing one of the elements managed by the operating system and having a size based on the tracked behavior of the user with respect to the element represented by the object; and allowing, with the processor, the user to access at least one of the elements in the operating system using the tag cloud.

A method of providing access to an element in an operating system executed by a processor includes: with the processor, tracking behavior of a user with respect to usage of a multiple computer programs managed by the operating system; generating a tag cloud having multiple objects, each object representing one of the computer programs most frequently used by the user and having a size proportionate to a determined frequency of use of the computer program represented by the object; and allowing, with the processor, the user to launch at least one of the computer programs using the tag cloud.

A system includes a processor and a memory communicatively coupled to said processor. The memory has executable code stored thereon such that the processor, upon executing the executable code, is configured to: track behavior of a user with respect to multiple elements managed by the operating system; generate a tag cloud having multiple objects, each of the objects representing one of the elements managed by the operating system and having a size based on the tracked behavior of the user with respect to the element managed by the operating system; and allow the user to access at least one of the elements using the tag cloud.

A computer program product for providing access to an element in an operating system includes a computer readable storage medium having computer readable program code embodied therewith. The computer readable program code includes: computer readable program code configured to track behavior of a user with respect to multiple elements managed by the operating system; computer readable program code configured to generate a tag cloud having multiple objects, each of the objects representing one of the elements managed by the operating system and having a size based on the tracked behavior of the user with respect to the element managed by the operating system; and computer readable program code configured to allow the user to access at least one of the elements using the tag cloud.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

Figure 1:
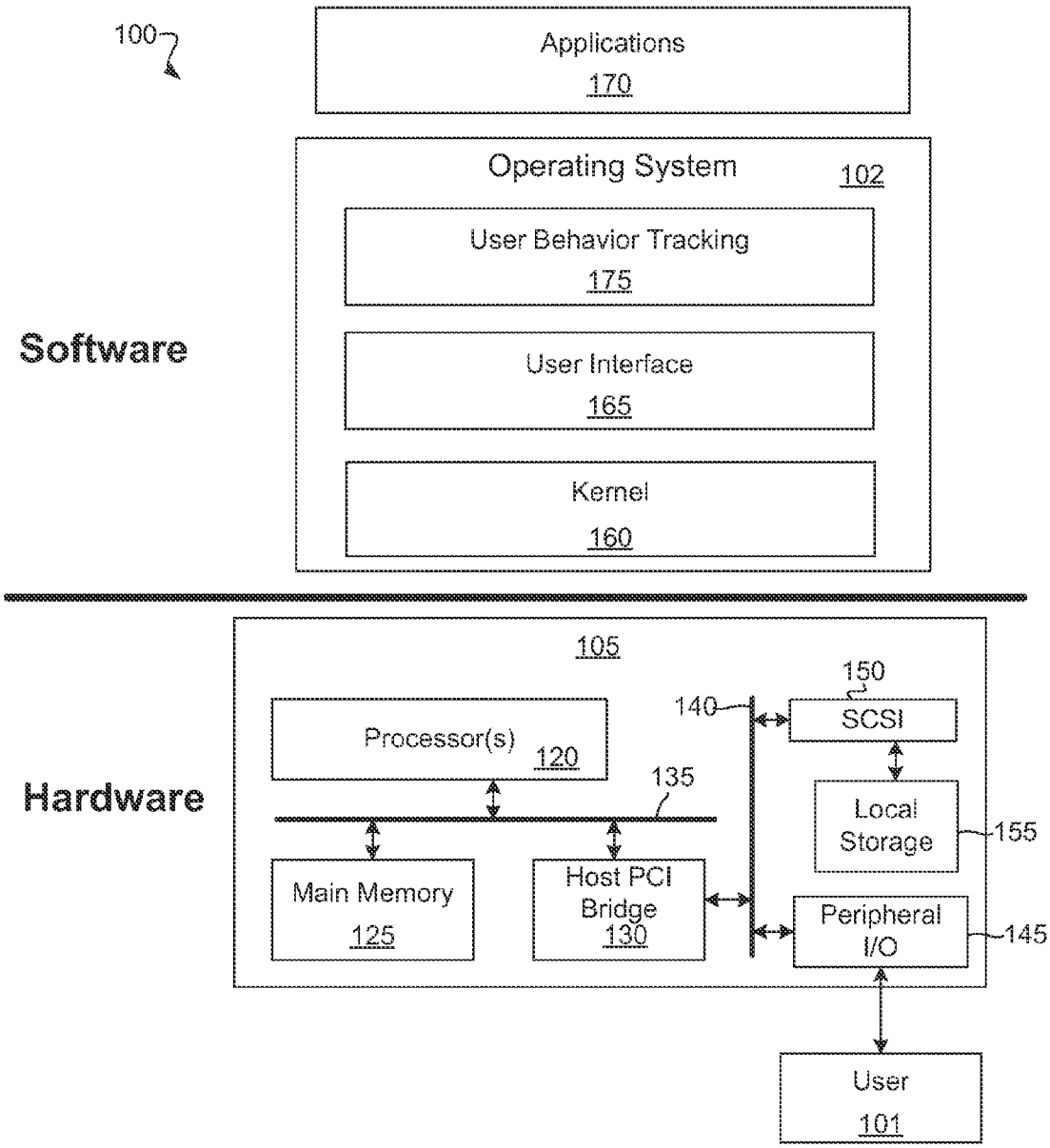
FIG. 1 is a block diagram of an illustrative system in which a user interacts with an operating system executed by a host computing device, according to one exemplary embodiment of principles described herein.

The present specification discloses methods and systems for interfacing with a user through an operating system. In particular, the present specification discloses tracking the behavior of the user with respect to multiple elements, such as computer programs or files, managed by the operating system and representing at least some of those elements to the user through a tag cloud. The tag cloud includes multiple objects; each of the objects represents one of the elements managed by the operating system and has a size based on the tracked behavior of the user with respect to the element represented by the object. For example, each object may represent a particular computer program and have a size proportionate to the frequency with which the user accesses that application. The user may directly launch one or more of the elements directly through the tag cloud. In this way, the operating system allows the user to quickly and visually ascertain which of the elements he or she is most likely to launch and provides a simple, intuitive way for the user to launch those elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification and in the appended claims, the term "tag cloud" refers to a visual display of a plurality of objects, where each object has a visual property proportionate to a metric associated with that object.

For the sake of clarity, the principles of the present specification are set forth with regard to tag cloud examples where the size of each object in the tag cloud is reflective of a metric associated with that particular object. However, it should be understood that these principles also apply to tag clouds in which any other visual property of the objects vary according to the specified metric, including, but not limited to, color, font type, text formatting, and the like.

With reference now to FIG. 1, a block diagram is shown of an illustrative computing system (100) through which a user (101) may interact with an operating system (102) executed by an underlying hardware platform (105).

The hardware platform (105) of the computing system (100) may include at least one processor (120) that executes code stored in the main memory (125). In certain embodiments, the processor (120) may be a multi-core processor having multiple independent central processing units (CPUs), with each CPU having its own L1 cache and all CPUs sharing a common bus interface and L2 cache. Alternatively, the processor (120) may be a single-core processor.

The at least one processor (120) may be communicatively coupled to the main memory (125) of the hardware platform and a host peripheral control interface bridge (PCI) (130) through a main bus (135). The main memory (125) may include dynamic non-volatile memory, such as random access memory (RAM). The main memory (125) may store executable code and data that is obtainable by the processor (120) through the main bus (135).

The host PCI bridge (130) may act as an interface between the main bus (135) and a peripheral bus (140) used to communicate with peripheral I/O devices (145). Among these peripheral devices may be a network interface configured to communicate with an external network, external human interface devices (e.g., monitor, keyboard, mouse, touch screen, speaker, microphone), other external devices (e.g., external storage, dongles, specialized tools), serial buses (e.g., Universal Serial Bus (USB)), and the like. A Small Computer System Interface (SCSI) (150) for communicating with local storage devices (155) may also communicate with the peripheral bus (140).

It will be readily apparent to those having skill in the art that the present configuration of the hardware platform (105) is merely illustrative of one type of hardware platform (105) that may be used in connection with the principles described in the present specification. Moreover, it will be further apparent that various modifications, additions, and deletions to the hardware platform (105) shown are conceivable and anticipated by the present specification.

The hardware platform (105) shown in the lower half of the diagram of FIG. 1 is configured to implement the elements of software functionality shown in the upper half of the diagram of FIG. 1. Thus, as shown in FIG. 1, an operating system (102) program is executed directly by the hardware platform (105). The operating system (102) includes at least a kernel (160) and a user interface (165). The kernel (160) is the core of the operating system (102) in that the kernel provides the lowest level of abstraction in the software functionality of the operating system (102). The kernel (160) may interact with and manage the performance of hardware resources in the hardware platform (105), including the processor(s) (120), the main memory (125), and the peripheral devices. Thus, the kernel (160) controls the execution of computer programs (170) by the processor(s) (120).

The user interface (165) of the operating system (102) enables a user (101) to launch and interact with the computer programs (170) executed by the processor(s) (120). For example, the user interface (165) may display one or more menus to the user (101) through a peripheral display device and allow the user (101) to select a computer program to launch and/or a document to retrieve through a peripheral I/O device such as a mouse or a keyboard.

The operating system (102) may further be configured to implement user behavior tracking (175) with respect to the computer programs (170) and files used by a specific user (101). For instance, the operating system (102) may keep track of which computer programs (170) and/or files the user (101) opens, the length of time the user (101) accesses each computer program (170) and/or, file, the time of day at which the user (101) accesses each computer program (170) and/or file, the day of the week during which the user (101) accesses each computer program (170) and/or file, other contextual data related to the access of each computer program (170) and/or file accessed by the user.

This tracked behavior of the user (101) may be used by the operating system (102) to enhance the user interface (165) through which the user (101) may open the computer programs (170) and/or files. For example, the operating system (102) may use the tracked behavior of the user (101) to generate a smart list of the most commonly used computer programs (170) and/or files by the user (101) and translate the list into a tag cloud such that the user (101) will have an intuitive visual representation of the computer programs (170) and/or files he or she most frequently uses and be able to quickly launch a computer program (170) and/or file represented in the tag cloud by clicking on the representation of the computer program (170) and/or file in the tag cloud.

Figure 2:
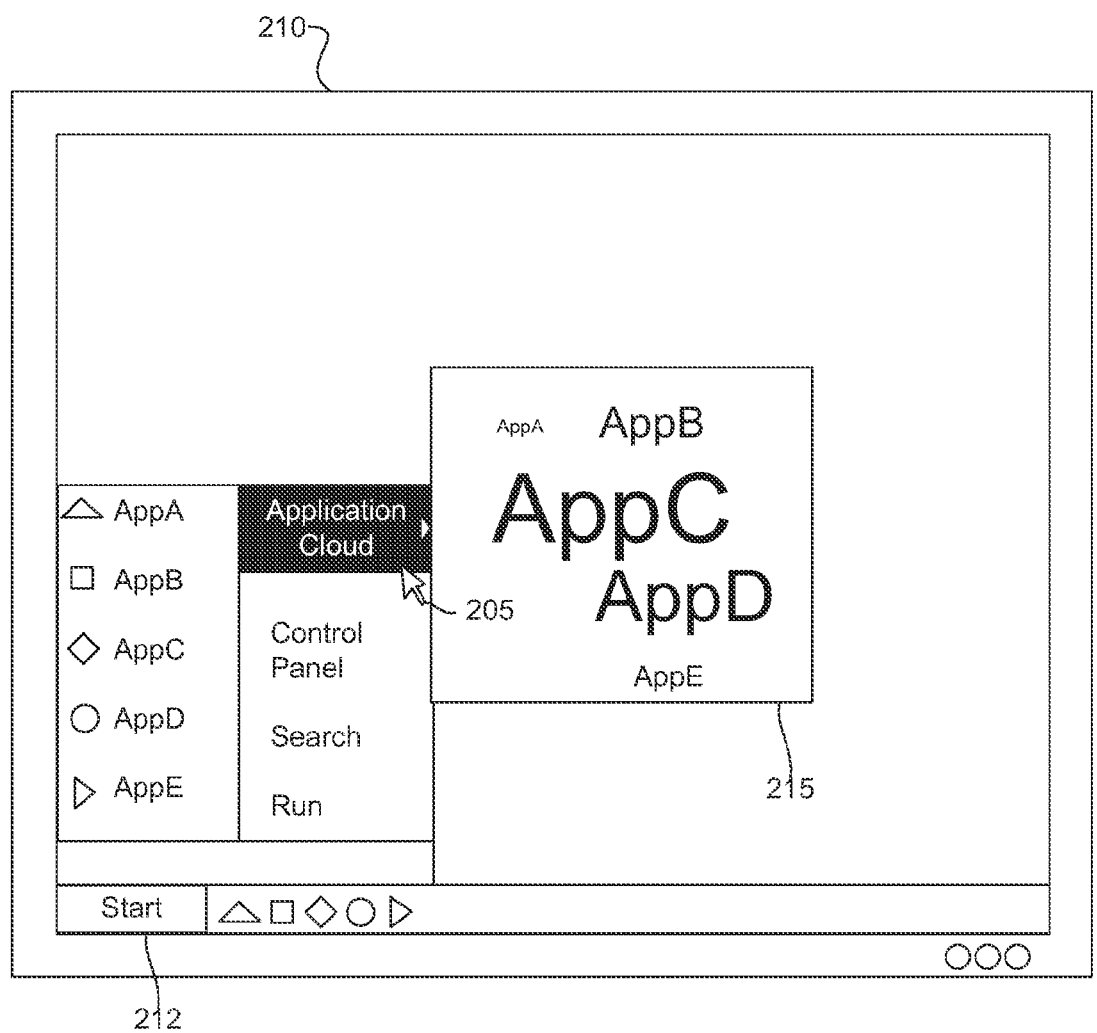
FIG. 2 is a diagram of an illustrative graphical user interface of an operating system through which a tag cloud is displayed to a user, according to one exemplary embodiment of principles described herein.

FIG. 2 shows one example of how an operating system may present this type of tag cloud to the user. As shown in FIG. 2, the user interface of an operating system may output an interactive display on a display device (210). This interactive display may allow the user to interact with the operating system through the use of a cursor (205).

In this particular example, the operating system user interface includes a Start Menu which the user may access by selecting a "Start" button (212) at the bottom of the screen of the display device (210). The Start Menu includes an "Application Cloud" option, which the user may select by rolling the cursor (205) over the words "Application Cloud" in the Start Menu. Doing so causes the operating system to display a tag cloud (215) of computer programs most frequently accessed by the user. Thus, in the present example, the tag cloud includes separate textual labels for the following computer programs: AppA, AppB, AppC, AppD, and AppE. The size of each label is proportionate to the frequency with which the user access the computer program represented by that particular label based on the tracked behavior of the user. For instance, the label for the AppC computer program has the largest font size of any of the labels shown in the tag cloud (215), indicating that the user accesses the AppC computer program more frequently than any other computer program represented in the tag cloud (215). Similarly, the label for the AppA computer program has the smallest font size of any of the labels shown in the tag cloud (215), indicating that the user accesses the AppA computer program less frequently than any other computer program represented in the tag cloud (215). The user may launch any of the computer programs represented in the tag cloud (215) by simply selecting the label that represents the computer program he or she wishes to open with the cursor (205).

The computer programs represented by labels in the tag cloud (215) are a subset of all of the computer programs available through and managed by the operating system. In certain examples, the computer programs represented in the tag cloud (215) may be the computer programs most commonly accessed by the user. Alternatively, the computer programs represented in the tag cloud (215) may be selected using other criteria such that the tag cloud (215) visually represents the relative frequency of use for each computer program only as compared to the other computer programs represented in the tag cloud (215).

As shown in FIG. 2, the labels in the tag cloud (215) may be arranged in alphabetical order. Alternatively, the labels may be arranged in the tag cloud (215) by font size, by a best-fit algorithm, or using any other methodology that may suit a particular application of the principles described herein. It will be readily apparent to one having ordinary skill in the art that the total number of labels in the tag cloud (215) may be a fixed number, or alternatively may dynamically vary based on the available space for displaying the tag cloud (215), the number of characters in each labels, the visual properties of the labels, and/or the preferences of the user.

In determining how frequently a user uses a particular computer program, the operating system may track various factors, including, but not limited to the number of times that a user has launched the particular computer program, the length of time spent by the user on the computer program, the times of day at which the user uses the computer program, the days of the week during which the user uses the computer program, other computer programs accessed by the user concurrently with the computer program, and/or any other contextual data that may suit a particular application of these principles.

In this way, the computer programs represented in the tag cloud (215) and their displayed relative frequency of use may vary based on the time of day, day of the week, and/or contextual data. For example, on weekends a user might more frequently access computer programs related to gaming and personal email, whereas on the weekdays that same user may more frequently open work-related computer programs. Thus, the tag cloud (215) may represent gaming and personal email computer programs more prominently on a weekend while representing work-related computer programs more prominently on a weekday. In another example, a user may typically open a developer computer program together with an internet browser computer program. Thus, the tag cloud (215) displayed to the user when the developer computer program is already running may feature the internet browser computer program more prominently than when the developer computer program is not running.

Figure 3:
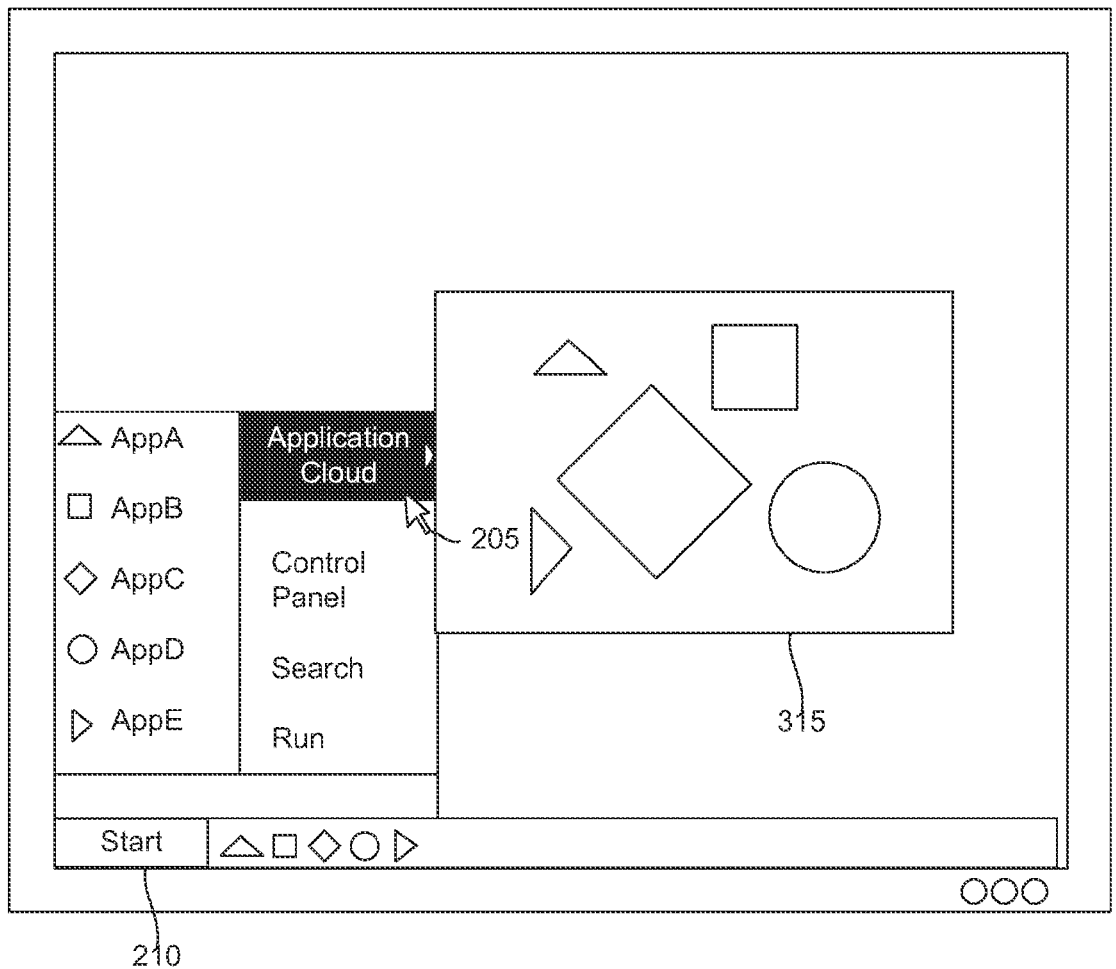
FIG. 3 is a diagram of an illustrative graphical user interface of an operating system through which a tag cloud is displayed to a user, according to one exemplary embodiment of principles described herein.

FIG. 3 shows another example of a tag cloud (315) displayed to a user with a display device (210) by the user interface of an operating system in which graphical icons are used instead of textual labels to represent the various computer programs. The relative size of each icon in the tag cloud (315) is proportionate to a determined frequency of use for that computer program based on tracked user behavior consistent with the principles described above. As with the example of FIG. 2, the user may cause the operating system to launch any of the computer programs represented in the tag cloud (315) by using the cursor (205) to select the icon corresponding to the computer program the user wishes to launch.

Figure 4:
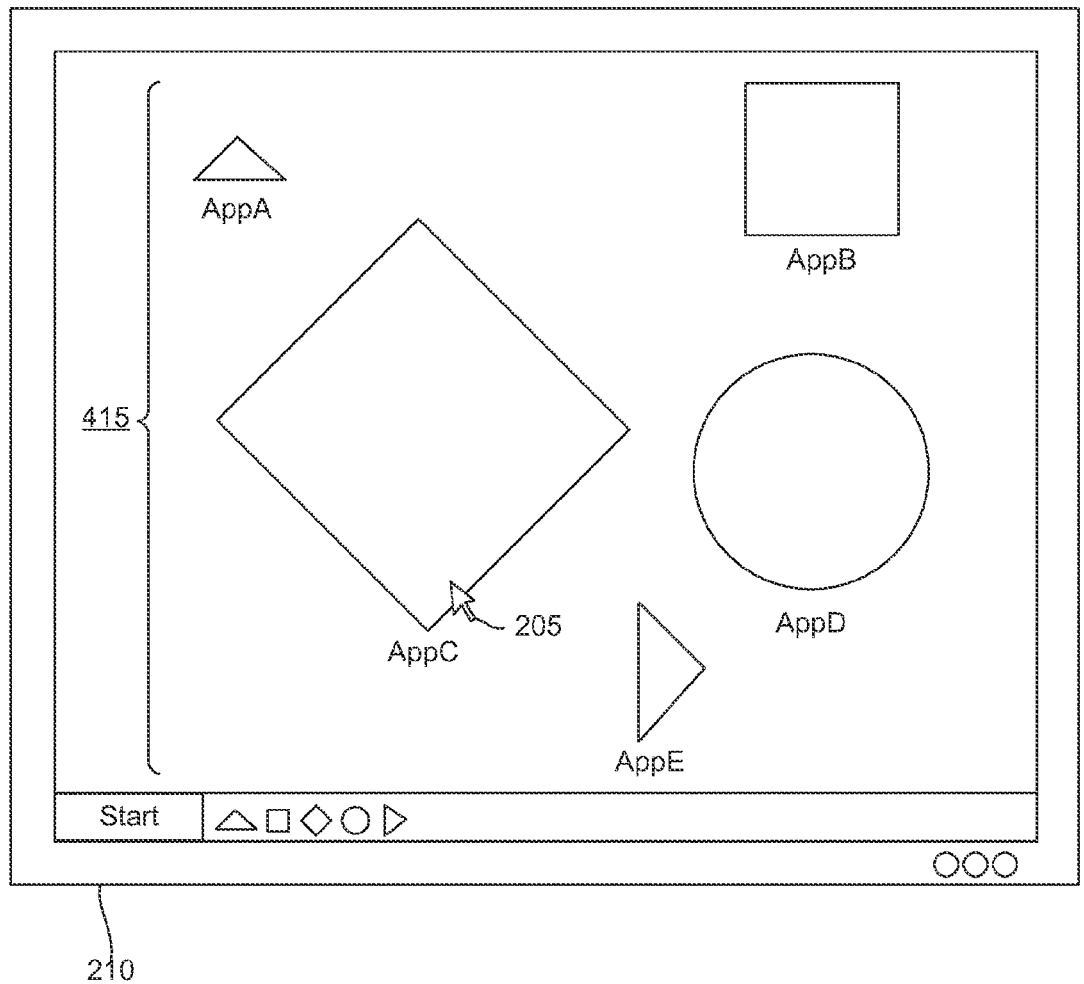
FIG. 4 is a diagram of an illustrative graphical user interface of an operating system through which a tag cloud is displayed to a user, according to one exemplary embodiment of principles described herein.

FIG. 4 shows another example of a tag cloud (415) displayed by an operating system user interface on a display device. In this example, the tag cloud (415) is displayed directly on the desktop of the operating system user interface. The graphical icons on the desktop represent various computer programs managed by the operating system. The relative size of each icon in the tag cloud (415) is proportionate to a determined frequency of use for that computer program based on tracked user behavior consistent with the principles described above. As with the example of FIGS. 2 and 3, the user may cause the operating system to launch any of the computer programs represented in the tag cloud (415) by using the cursor (205) to select the icon corresponding to the computer program the user wishes to launch.

Figure 5:
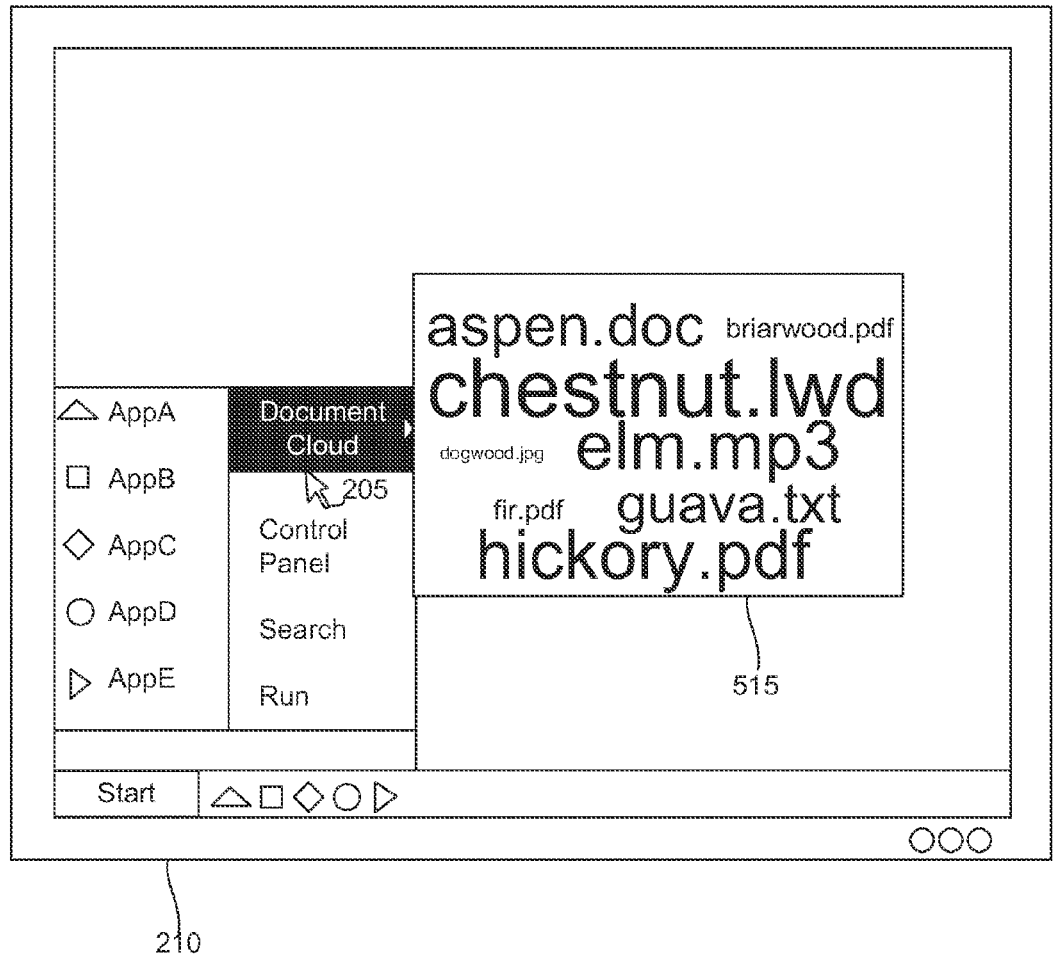
FIG. 5 is a diagram of an illustrative graphical user interface of an operating system through which a tag cloud is displayed to a user, according to one exemplary embodiment of principles described herein.

FIG. 5 shows another example of a tag cloud (515) displayed by an operating system on a display device (210). In this particular example, tag cloud (515) includes multiple textual labels that represent specific files rather than computer programs. The size of the textual labels may be proportionate to the frequency with which the files are used, according to tracked user behavior consistent with the principles described herein. By selecting one of the labels with the cursor (205), the user may cause the operating system to open that particular file. This opening of the file may also require the operating system to launch a computer program associated with the selected file.

Figure 6:
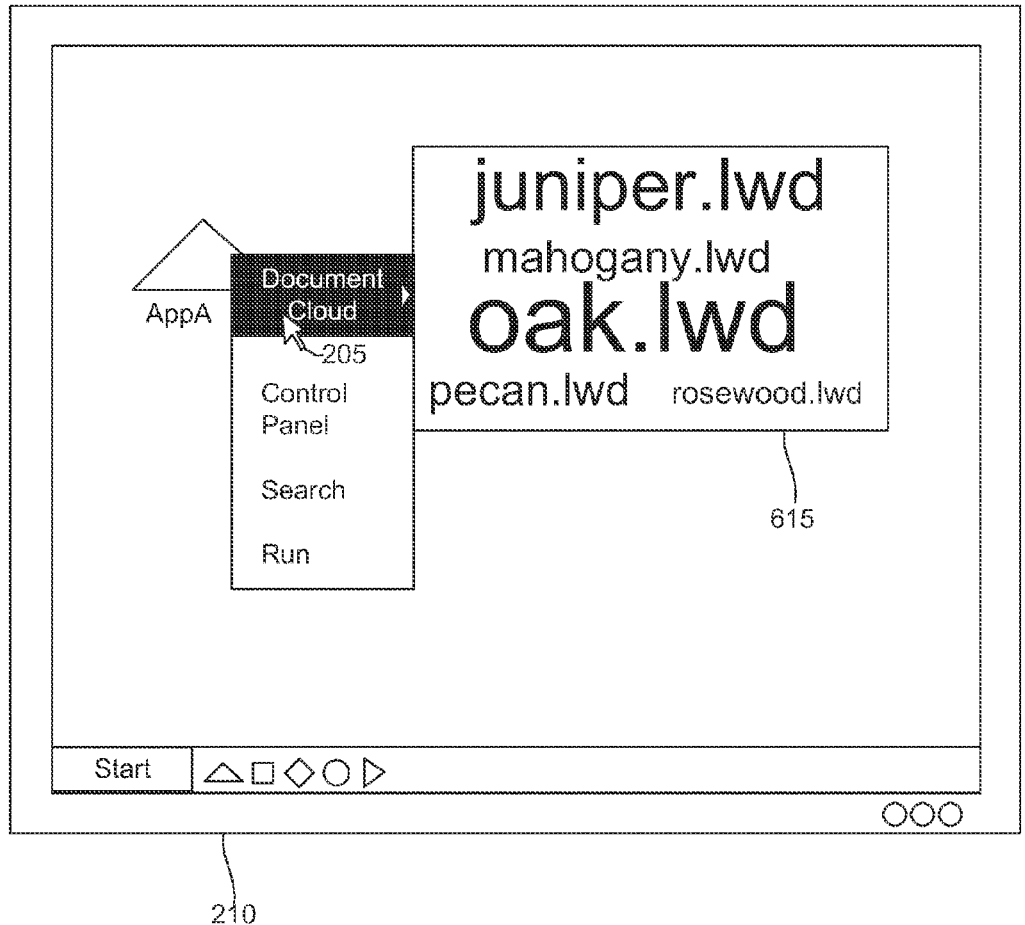
FIG. 6 is a diagram of an illustrative graphical user interface of an operating system through which a tag cloud is displayed to a user, according to one exemplary embodiment of principles described herein.

FIG. 6 shows another example of a tag cloud (615) displayed by an operating system on a display device (210). As shown in FIG. 6, the tag cloud (615) is displayed when the user selecting a particular computer program with the cursor (205), bringing up a menu associated with that particular computer program (e.g., by right-clicking or ctrl-clicking on an icon for the computer program) and selecting a "Document Cloud" option. As with the example of FIG. 5, the tag cloud (615) of the present example includes multiple textual labels that represent specific files rather than computer programs. However, rather than showing a list of all most frequently used files for the operating system, the present tag cloud (615) shows a list of the most frequently used files for only the selected computer program.

The size of each textual label is proportionate to the frequency with which the user accesses the file represented by that label, according to tracked user behavior consistent with the principles described herein. By selecting one of the labels with the cursor (205), the user may cause the operating system to open that particular file. This opening of the file may also require the operating system to launch a computer program associated with the selected file.

Figure 7:
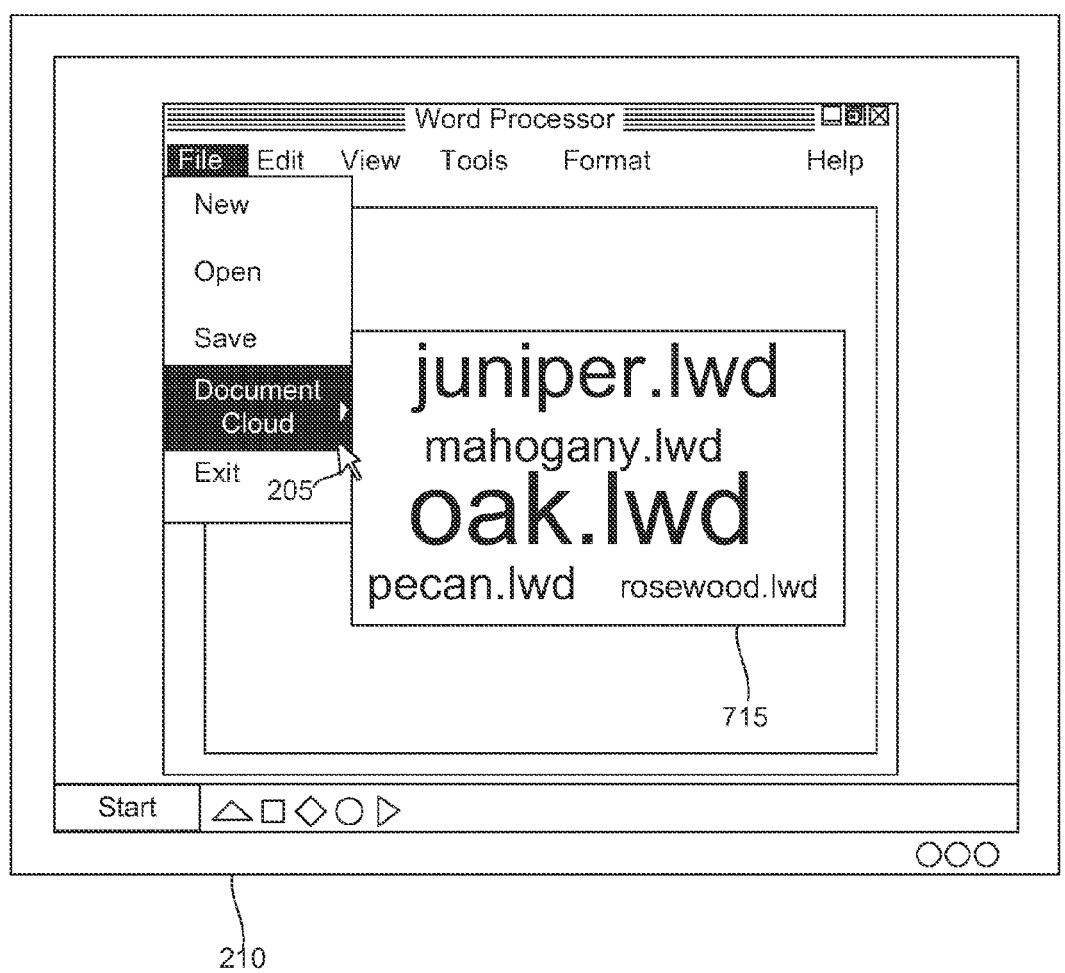
FIG. 7 is a diagram of an illustrative graphical user interface of an operating system through which a tag cloud is displayed to a user, according to one exemplary embodiment of principles described herein.

FIG. 7 shows another example of a tag cloud (715) displayed by an operating system on a display device (210). As shown in FIG. 7, the tag cloud (715) of this particular example is displayed within the drop-down menu of a running computer program to display labels corresponding to the files most recently used with the running computer program according to tracked user behavior consistent with the principles described herein. As with the other examples, the size of each label is proportionate to the frequency with which the file represented by the label is accessed by the user. By selecting one of the labels with cursor (205), the user may cause the running computer program to load the file represented by that particular label.

Figure 8:
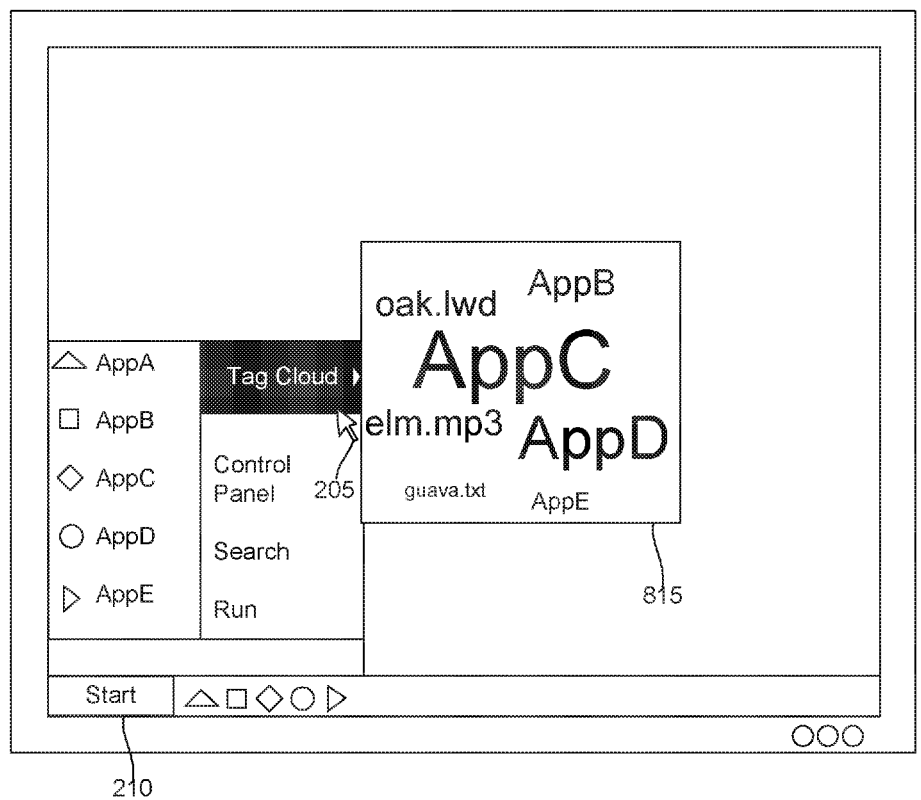
FIG. 8 is a diagram of an illustrative graphical user interface of an operating system through which a tag cloud is displayed to a user, according to one exemplary embodiment of principles described herein.

FIG. 8 shows another example of a tag cloud (815) displayed by an operating system on display device (210). The tag cloud (815) displays textual labels having different sizes similar to the tag clouds of previous examples. As shown in FIG. 8, the tag cloud (815) of the present example combines labels for computer programs and files. In a hybrid computer program/file tag cloud such as that of FIG. 8, the font sizes may be calculated differently for the file labels than for the computer program labels. For example, because computer programs are typically accessed more frequently than individual files, the operating system may adjust the font sizes of the file labels as compared to the font sizes of the computer program labels to provide a more visually appealing and aesthetically balanced tag cloud (815).

Figure 9:
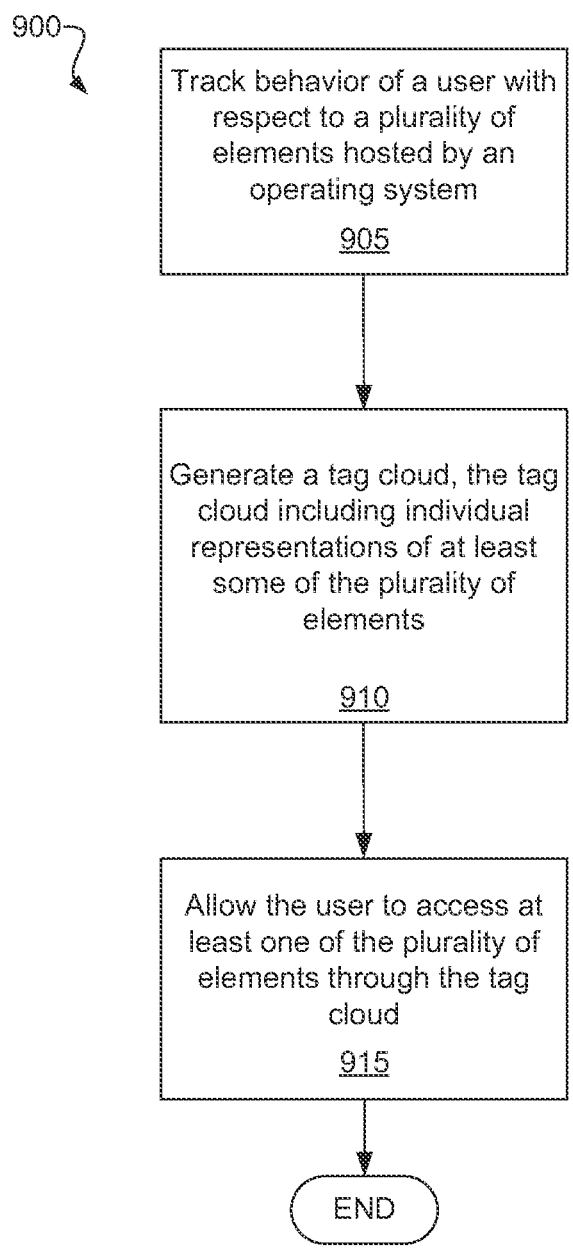
FIG. 9 is a flow diagram of an illustrative method of interfacing with a user through an operating system, according to one exemplary embodiment of principles described herein.

FIG. 9 shows a flow diagram of an illustrative method (900) of interfacing with a user through an operating system. The method (900) may be performed by a processor under the direction of an operating system, as described previously with reference to FIG. 1. In the method (900), the behavior of a user is tracked (step 905) with respect to a plurality of elements hosted by an operating system. The elements may be, for example, computer programs, files, or a combination of computer programs and files. The tracked behavior may include a frequency with which the user opens each element, the length of time the user spends accessing each element, the time of day at which the user accesses each element, the day of the week during which the user accesses each element, which elements are accessed concurrently, other contextual data, and the like.

A tag cloud is then displayed (step 910) to the user through the operating system. The tag cloud includes a plurality of objects, each of the objects representing one of the elements managed by the operating system. Each object in the tag cloud has a size based on the tracked behavior of the user with respect to the element managed by the operating system that is represented by the object. Each object may be, for example, a textual label identifying the element represented by the object, or a graphical icon identifying the element represented by the object. The tag cloud may be displayed (step 910) to the user, for example, through a launch menu of the operating system, on a desktop display of the operating system, through a menu associated with a particular computer program, or the like.

The user is allowed (step 915) to access at least one of the elements through the tag cloud. For example, the user may select one of the objects in the tag cloud with a cursor to launch the element represented by that object.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method of providing access to an element executed by a processor, said method comprising:
with said processor, tracking behavior of a user with respect to a plurality of elements managed by an operating system, wherein the plurality of elements represent a number of computer programs;
tracking a frequency with which said user accesses each of the elements managed by the operating system based on the tracked behavior of the user, wherein the tracked behavior of the user comprises a time of day during which the user accesses each of the elements managed by said operating system;
generating a tag cloud comprising a plurality of objects, each of said objects representing one of said plurality of elements managed by said operating system and comprising a size based on said tracked behavior of said user with respect to said one of said plurality of elements managed by said operating system, wherein the objects representing the elements are presented in the tag cloud more prominently at the tracked time of day during which the user accesses each element, wherein the prominence of the objects is based at least in part on the tracked frequency;
in response to a selection of a start button displayed on a screen of the desktop, displaying a start menu on the screen of the desktop, the start menu comprising a cloud option, the cloud option comprising an application cloud;
in response to a selection of the application cloud, displaying the tag cloud of the plurality of objects representing the most frequently accessed computer programs at the tracked time of day; and
allowing, with said processor, said user to access at least one of said plurality of elements using said tag cloud.

2. The method of claim 1, wherein said tracking behavior of said user with respect to said plurality of elements managed by said operating system further comprises:
tracking a frequency with which said user access each said element in said plurality of elements managed by said operating system.

3. The method of claim 1, wherein said tracking behavior of said user with respect to said plurality of elements managed by said operating system further comprises:
tracking a length of time for which said user accesses each said element in said plurality of elements managed by said operating system.

4. The method of claim 1, wherein said tracking behavior of said user with respect to said plurality of elements managed by said operating system further comprises:
tracking contextual data pertaining to access by said user to each said element in said plurality of elements managed by said operating system.

5. The method of claim 1, wherein each said object in said plurality of objects of said tag cloud comprises a textual label identifying said one of said plurality of elements represented by said object.

6. The method of claim 1, wherein each said object in said plurality of objects of said tag cloud comprises a graphic icon identifying said one of said plurality of elements represented by said object.

7. The method of claim 1, wherein said allowing said user to access at least one of said plurality of elements using said tag cloud comprises:

receiving a selection of at least one said object in said tag cloud from said user; and launching with said operating system said element managed by said operating system represented by said selected object.

8. A method of providing access to an element in an operating system, said method comprising:

with said processor, tracking behavior of a user with respect to usage of a plurality of elements managed by said operating system, wherein said plurality of elements represent a number of computer programs;

tracking a frequency with which the user accesses each of the elements managed by the operating system based on the tracked behavior of the user, wherein the tracked behavior of the user comprises a day of week during which the user accesses each of the elements managed by said operating system;

generating a tag cloud comprising a plurality of objects, each said object representing one of said elements most frequently used by said user and comprising a size proportionate to a determined frequency of use of said element represented by said object, wherein the objects representing the elements are presented in the tag cloud more prominently on the day of the week during which said user accesses each said element;

in response to a selection of a start button displayed on a screen of the desktop, displaying a start menu on the screen of the desktop, the start menu comprising a cloud option, the cloud option comprising an application cloud;

in response to a selection of the application cloud, displaying the tag cloud of the plurality of objects representing the most frequently accessed computer programs on the day of the week, wherein the relative size of the object is proportionate to the tracked frequency of use for the respective computer program based on the tracked user behavior; and allowing, with said processor, said user to launch at least one of said plurality of computer programs using said tag cloud.

9. The method of claim 8, wherein said determined frequency of use of each said element represented in said tag cloud is based on at least a tracked frequency with which said user launches said element.

10. The method of claim 8, wherein said determined frequency of use of each said element represented in said tag cloud is based on a tracked length of time for which said user accesses said element.

11. The method of claim 8, wherein said determined frequency of use of each said element represented in said tag cloud is based on historical data for at least one of a current time of day and a current day of week.

12. The method of claim 8, wherein each said object in said plurality of objects of said tag cloud comprises a textual label identifying said one of said plurality of elements represented by said object.

13. The method of claim 8, wherein each said object in said plurality of objects of said tag cloud comprises a graphic icon identifying said one of said plurality of elements represented by said object.

14. The method of claim 8, wherein said allowing said user to launch at least one of said elements using said tag cloud comprises:

receiving a selection of at least one said object in said tag cloud from said user; and launching with said operating system said element represented by said selected object.

15. A system, comprising:

a processor; and a memory communicatively coupled to said processor, said memory comprising executable code stored thereon such that said processor, upon executing said executable code, is configured to:

track behavior of a user with respect to a plurality of elements managed by said operating system, the elements being executable by the processor, wherein said plurality of elements represent a number of files:

track a frequency with which said user accesses each of the elements managed by the operating system based on the tracked behavior of the user, wherein the tracked behavior of the user comprises a time of day during which the user accesses each of the elements managed by the operating system;

generate a tag cloud comprising a plurality of objects, each of said objects representing one of said plurality of elements managed by said operating system and comprising a size based on said tracked behavior of said user with respect to said one of said plurality of elements managed by said operating system, wherein the objects representing the elements are presented in the tag cloud more prominently at the tracked time of day during which said user accesses each said element, wherein the prominence of the objects is based at least in part on the tracked frequency;

in response to a selection of a start button displayed on a screen of the desktop, displaying a start menu on the screen of the desktop, the start menu comprising a cloud option comprising an application cloud;

in response to a selection of the application cloud, displaying the tag cloud of the plurality of objects representing the most frequently accessed computer programs at the tracked time of day; and allow said user to access at least one of said plurality of elements using said tag cloud.

16. A computer program product for providing access to a computer program in an operating system, the computer program product comprising:

a non-transitory computer readable storage medium having computer readable program code embodied therewith, the computer readable program code to, when executed by a processor:

track behavior of a user with respect to a plurality of computer programs managed by said operating system, the elements being executable by the processor;

track a frequency with which the user accesses each of the computer programs managed by the operating system based on the tracked behavior of the user, wherein the tracked behavior of the user comprises a time of day during which the user accesses each of the computer programs, and wherein the objects representing the computer programs are presented in the tag cloud more prominently at the tracked time of day during which said user accesses each said element;

generate a first tag cloud comprising a plurality of objects, each of said objects representing one of said plurality of computer programs managed by said operating system and comprising a size based on said tracked behavior of said user with respect to said one of said plurality of computer programs managed by said operating system, wherein the objects representing the computer programs are presented in the tag cloud more prominently at the tracked time of day during which said user accesses each said element, wherein the prominence of the objects is based at least in part on the tracked frequency;

in response to a selection of a start button displayed on a screen of a desktop, displaying a start menu on the screen of the desktop, the start menu comprising a cloud option comprising an application cloud;

present a menu associated with a user-selected one of the plurality of objects, the menu comprising a document cloud selection, wherein the document cloud, when selected, presents a number of documents associated with the computer program associated with the selected one of the plurality of objects within a second tag cloud; and allow said user to access at least one of said plurality of computer programs using said tag cloud.

17. The computer program product of claim 16, wherein the selected one of the plurality of objects is selected using a selection method other than a selection method associated with an execution of the computer programs.

* * * * *